Sept. 16, 1924.      E. ROBERTS      1,508,577
BRAKE FOR GYRATORY CENTRIFUGALS
Filed Aug. 30, 1920
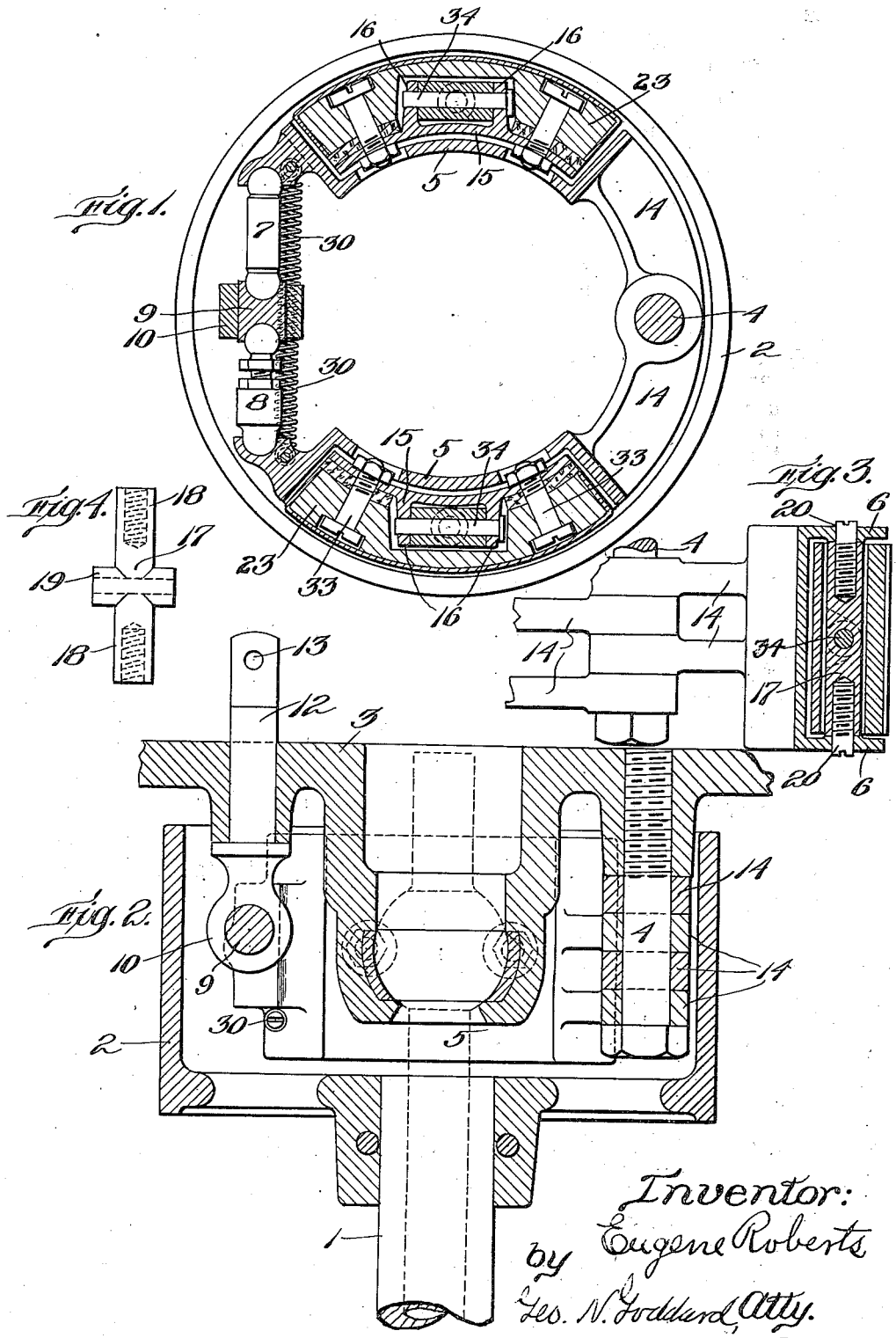

Patented Sept. 16, 1924.

1,508,577

UNITED STATES PATENT OFFICE.

EUGENE ROBERTS, OF SALT LAKE CITY, UTAH, ASSIGNOR TO THE WESTERN STATES MACHINE COMPANY, OF SALT LAKE CITY, UTAH, A CORPORATION OF UTAH.

BRAKE FOR GYRATORY CENTRIFUGALS.

Application filed August 30, 1920. Serial No. 406,857.

*To all whom it may concern:*

Be it known that I, EUGENE ROBERTS, a citizen of the United States, and resident of Salt Lake City, county of Salt Lake, and State of Utah, have invented certain new and useful Improvements in a Brake for Gyratory Centrifugals, of which the following is a specification.

This invention comprises certain improvements in brakes for gyratory centrifugal machine shafts or the like, and is intended to provide a durable and efficient construction by which the maximum power of the brake is secured at all times, and loss of efficiency due to inperfections in the present style of brakes employed in this class of machines as well as injury to the apparatus is avoided or minimized.

It is the common practice in this class of machines to employ a pulley or wheel that is fast on the rotary gyratory shaft that carries the basket and to mount the brake members on a suitable fulcral pivotal support in the form of a vertical pivot post secured in the suspension hanger by which the machine is carried. The movement of the brake members against the friction pulley is in a horizontal plane, while owing to the gyration of the suspension shaft or spindle the pulley thereon is tilted or inclined at an angle to the horizontal plane in which position only a small part of the friction surface of the brake shoes are engaged with the pulley. Often times the heavy lateral pressure exerted by the gyrating shaft acts to spring or bend the fulcral post that supports the brake members with the result that the pressure is exerted principally at the heel portions of the brake shoes which I have found often results in causing such downward lateral pressure of the rotating shaft against its inside suspension spindle as to injure the anti-friction Babbitt lining and cause serious injury to the machine.

Having observed these results and having ascertained the causes thereof, I have devised a novel construction of brake for the purpose of overcoming these difficulties.

To this end my invention comprises a plurality of pivotally mounted brake members supported to be moved into and out of operative relation to the shaft pulley, and carrying self-adjusting friction shoes which accommodate themselves to the various angle inclinations of the pulley so that the friction shoes always maintain full friction engagement with the pulley thereby equalizing the frictional pressure over the entire friction surface of each brake shoe. By thus distributing the braking pressure over the entire friction face of each brake shoe and allowing the brake shoe to adjust itself in parallelism with the pulley in all positions, these difficulties are avoided and the gyration or life of the brake mechanism is prolonged while protecting the lateral bearing between the shaft and the inside spindle from injury to the causes described.

In the accompanying drawings I have illustrated the preferred construction and arrangement embodying the principles of this invention, in which:

Figure 1 is a plan view showing the brake members in their assembled relationship to the surrounding shaft pulley.

Figure 2 is a central vertical section of the centrifugal suspension hanger, the brake and the shaft pulley on the diametrical plane through the pivotal axis of the brake members.

Figure 3 is a detail view showing a cross-sectional elevation through one of the brake members at its middle point.

Figure 4 is a side elevation showing a separate detail of the swiveled brake shoe supporting member.

In the practice of the invention according to the form illustrated in the drawings, I have shown the upper end of the hollow basket-carrying shaft 1 to which is bolted the split hub of the driving pulley 2 in normal relationship to the usual socket hanger 3 which forms the suspension member for supporting the well-known inner gyratory suspension spindle and ball which is indicated in dotted lines in Figure 2.

In one side of the hanger is secured the vertical fulcral or pivot post 4 which passes through the perforated hinged lugs 14 of the two brake members 5 to form a supporting hinge to allow these members to expand and contract in a horizontal plane.

The brake members are forced toward the pulley by any suitable operating mechanism, that herein shown comprising the usual toggle joint consisting of the toggle member 7 and the extensible toggle member 8 having ball and socket engagement with the free ends of the brake members and having also ball and socket engagement with the intermediate socket piece 9 which is carried in the vertically movable slide rod 12 whose upper end is provided with a bolt hole 13 for adjustment to a suitable actuating lever not shown.

It will be understood that the downward movement of the actuating member 12, shown in Figure 2, tends to force apart the outer end of the toggle members so as to press the brake members with a powerful pressure against the interior face of the pulley. The brake shoes are normally kept out of contact with the pulley by means of tension springs 30 which tend to flex the toggles in opposition to the expanding movement caused by the toggle actuating rod 12.

The brake members or arms 5 are provided with upper and lower flanges 6 so as to form a segmental or curved box in which are mounted the friction shoes 23 that bear directly against the pulley. These friction shoes instead of being set solidly into the brake members are mounted therein in such a way that they are free to adjust themselves so that their faces, in this organization of the brake, their friction faces, will have full contact with the inner surface of the pulley owing to the automatic adjustment of their friction faces to the surrounding pulley whether the pulley lies in a horizontal plane or is inclined at an angle thereto as the basket shaft swings to one side or the other.

This self-adjustment is effected by supporting the friction shoes on a universal joint carried by the brake member.

The particular form of joint which I have shown in the drawings comprises a supporting member 17 in the form of a cross whose upper and lower arms 18 are tapped to receive pivotal screws 20 which, when the device is assembled, are journalled in bearing openings formed in the upper and lower flanges of the brake members thus permitting the shoe supporting member to oscillate about a vertical axis so that the end of the brake shoe may swing in or out to fit snugly inside the pulley.

The friction blocks 23 are usually made of wood or like material and these are bolted firmly to a curved plate 15 by means of traverse bolts 33. This holding plate 15 is provided with projecting lugs provided with bearing holes to receive horizontal supporting pins 34 which pass through the horizontal arms 19 at the middle part of the shoe-supporting member 17 so as to allow the holding plates to rock about the horizontal axes of these pins 34.

It will be seen that in effect each friction block or shoe is allowed to rock about a horizontal axis so that the whole friction face from top to bottom lies in contact or parallelism with the pulley in its different angles of inclination, while the pivotal movement about the vertical axis allows a similar adjustment of the whole brake surface from the rear to the front end thereof. Therefore, even if the fulcral post should be bent somewhat out of vertical alignment the friction shoes are still able to perfectly accommodate themselves to the position of the pulley when forced into contact therewith and the pressure is evenly distributed over the entire braking surface of each shoe.

With this arrangement I have found that the wear on the brake shoes is evenly distributed, that the brake shoes are unaffected in their action by any springing of their supporting post and that undue lateral stress of the shaft on its inner spindle with consequent injury to the bearing is wholly avoided.

What I claim is:

1. In a brake for a gyratory centrifugal, the combination with a rotary basket shaft suspended to permit gyration upon a universal joint, of a brake pulley secured to said shaft around the center of gyration to rotate and gyrate therewith, cooperating brake arms fulcrumed upon a fixed axis located on one side of the center, brake-expanding means located on the opposite side of the center, and friction brake shoes supported by said brake arms by jointed connection permitting their outer friction faces to automatically adjust themselves to maintain full contact with the surrounding friction face of the pulley in the various positions assumed by the pulley in its gyration and rotation about the gyratory center, substantially as described.

2. In a brake for a gyratory centrifugal, or the like the combination of a rotary brake element secured to and rotating with the gyratory shaft, movable brake members mounted on a fulcral support to be moved against and away from the rotary element, friction shoes mounted in said brake members upon universal joints whereby the friction shoes adjust themselves to the angular deflection of the rotary element out of the plane of movement of said brake members by reason of the pressure between the shoes and said rotary element in order to equalize the pressure on different portions of the friction surfaces, substantially as described.

3. A brake for a gyratory centrifugal or the like embracing in its construction a plurality of brake members a vertical post forming a fulcral support for the movable brake members, friction shoes mounted in said brake members to have movement about a universal joint in order to bring substantially their whole friction faces to bear against the brake pulley of the centrifugal, and means for actuating said brake shoes to exert braking pressure on such pulley, substantially as described.

4. A brake for a gyratory centrifugal shaft pulley or the like embracing in its construction cooperating pivoted brake members and operating means therefor, friction shoes mounted in said brake members to have pivotal movement about two axes substantially perpendicular to each other in order to equalize the pressure over the friction faces of the shoes in the various angular positions of the shaft pulley, substantially as described.

5. A brake for a gyratory centrifugal shaft embracing in combination with a pulley on the shaft, cooperating pivotally mounted brake arms, friction shoes pivotally mounted on supporting members that are pivotally mounted in said brake arms about an axis transverse to the pivotal axes connecting the shoes with said supporting members, substantially as described.

6. A brake mechanism for a gyratory centrifugal shaft or the like embracing in combination with a pulley fixed to the shaft, cooperating friction shoes mounted to have movement about three different pivotal axes, whereby the friction shoes are moved into complete frictional engagement with the friction surface of said pulley in its different angular positions for braking purposes, substantially as described.

7. A brake mechanism for a gyratory centrifugal shaft or the like embracing in combination with a pulley fixed to the shaft, cooperating friction shoes mounted to have movement about three different pivotal axes, one of said pivotal axes being disposed at substantially right angles to the others, substantially as described.

8. A brake for the gyratory shaft of a centrifugal or the like embracing in combination with a brake pulley on said shaft, two brake members pivotally mounted on a vertical axis to swing toward and away from the pulley, friction shoes pivotally mounted on supports, said supports being themselves pivotally mounted in said swinging brake members about axes transverse to the axes forming the pivotal connection between themselves and the friction shoes, substantially as described.

9. A brake member for a gyratory shaft embracing in construction, an arm mounted to swing about an axis in substantial parallelism with the normal axial line of the shaft, a shoe supporting member pivotally mounted in said arm, a friction shoe pivotally mounted on said supporting member with its pivotal axis disposed at right angles to the pivotal axes on which said supporting member turns, substantially as described.

10. A brake shoe for a gyratory shaft embracing in its construction a carrying arm adapted to be pivotally mounted on a supporting axis, a cruciform shoe supporting member pivotally mounted in said carrying arm to turn about one axis of the cruciform member, a friction shoe pivotally supported to turn about the other axis of said cruciform member, said shoe being formed with a curved friction face to engage a corresponding face of a brake pulley, substantially as described.

11. A brake member for a gyratory shaft embracing a carrying arm adapted to be pivotally mounted on a suitable support, and formed with a shoe receiving recess, a shoe supporting member mounted in said arm to swing about an axis in substantial parallelism with the normal axis of the gyratory shaft, a shoe carrying plate pivotally mounted on said supporting member to turn about an axis transverse to the pivotal axis of said supporting member, and a friction block detachably secured to said plate, substantially as described.

12. A brake shoe for a rotary shaft embracing in its construction a curved arm provided with upper and lower laterally projecting lugs, a shoe supporting member pivotally supported by said lugs to move about an axis parallel with the shaft, a shoe carrying plate having transverse lugs having pivotal connection with said supporting member to turn about an axis transverse to the pivotal axis of said support, and a friction block secured to said carrying plate, substantially as described.

In witness whereof, I have subscribed the above specification.

EUGENE ROBERTS.